Oct. 11, 1938.   G. K. S. FERGUSON   2,133,021
PACKAGE
Filed Oct. 15, 1935    3 Sheets—Sheet 1
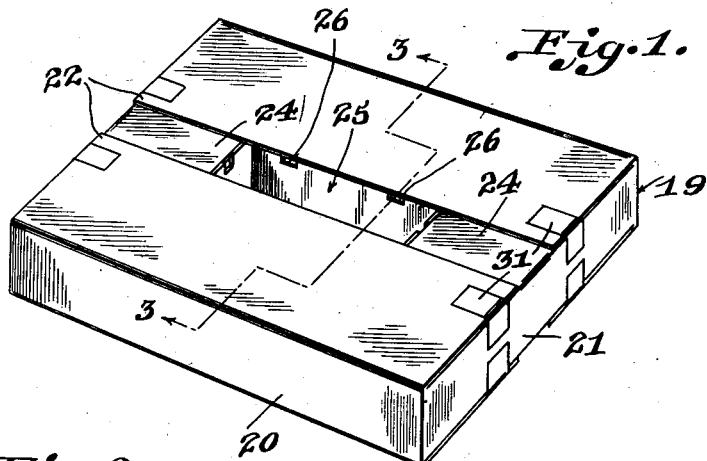
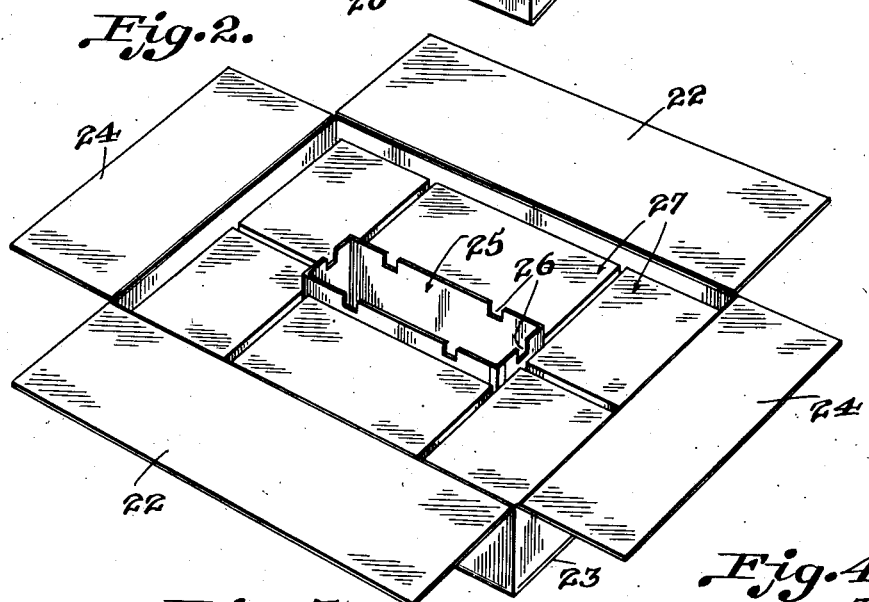
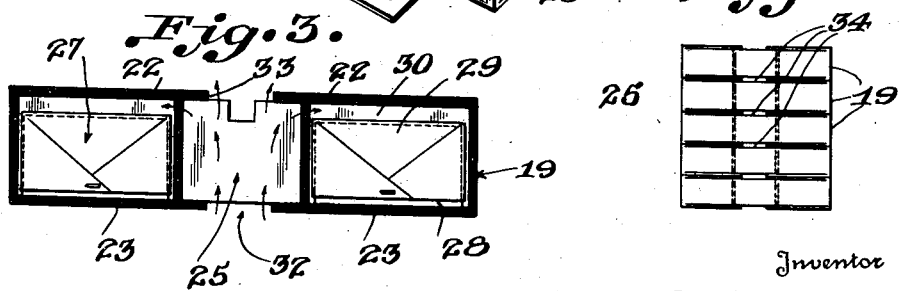
Inventor
George K. S. Ferguson
By Seymour & Bright
Attorneys Oct. 11, 1938. G. K. S. FERGUSON 2,133,021
PACKAGE
Filed Oct. 15, 1935 3 Sheets-Sheet 2
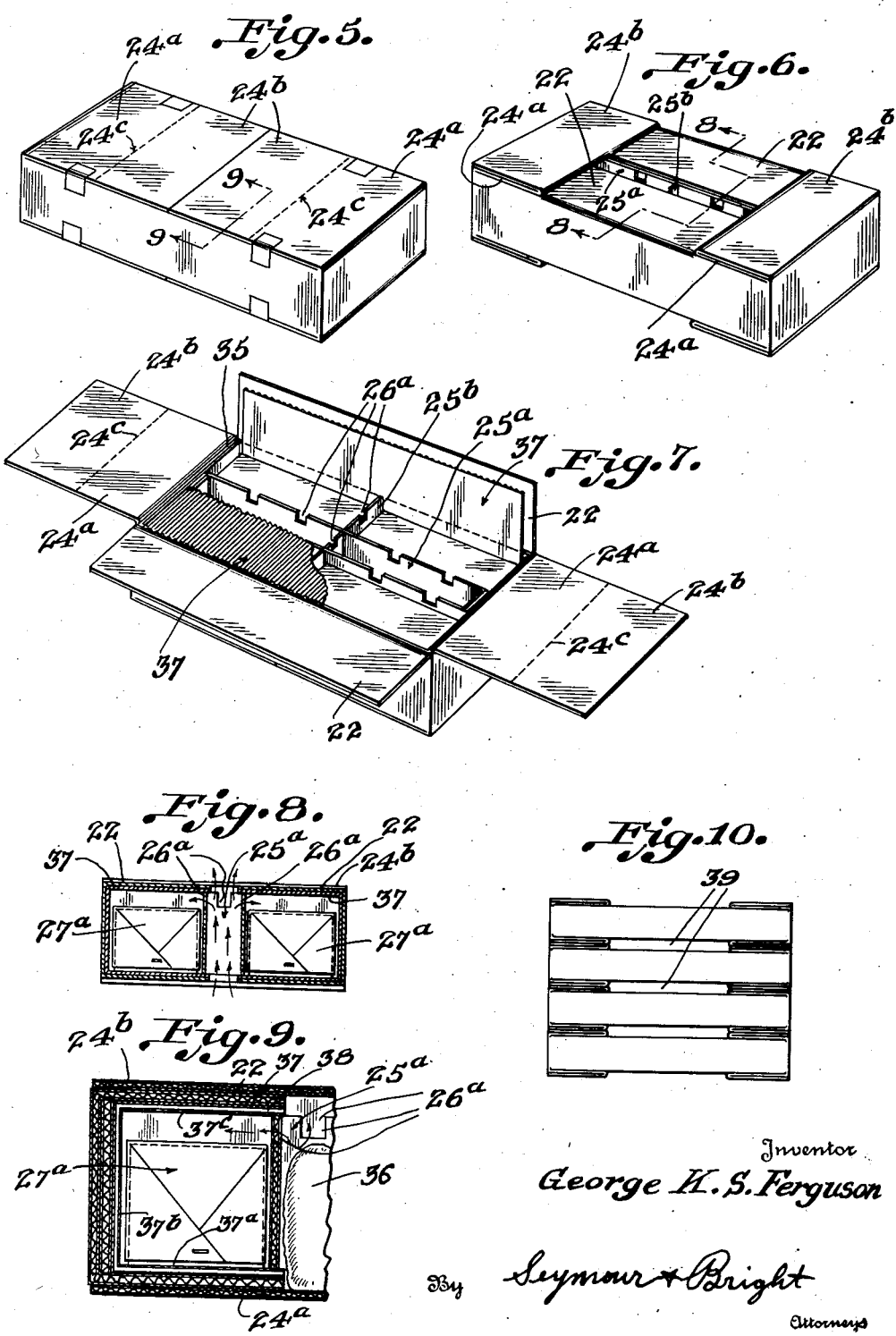

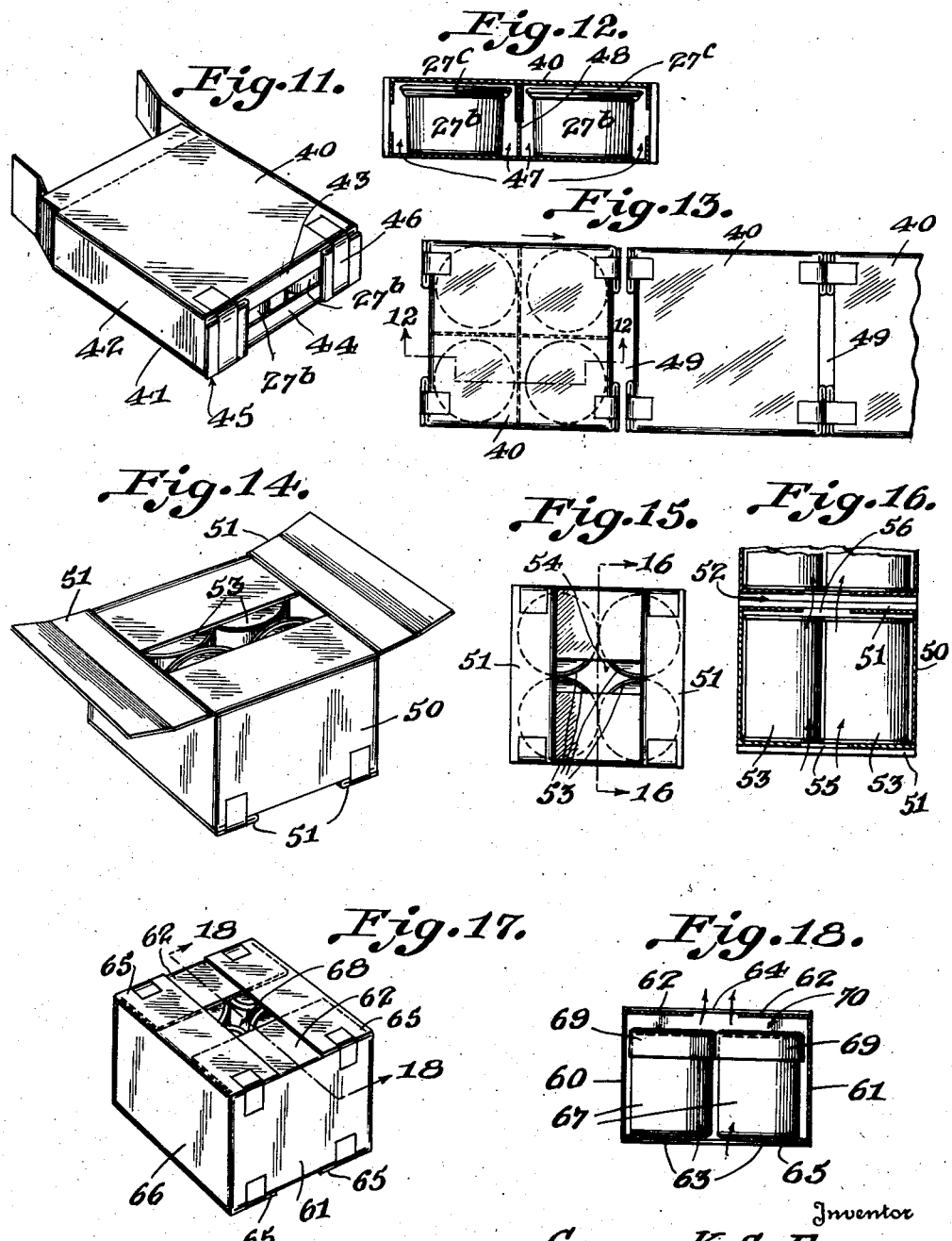

Patented Oct. 11, 1938

2,133,021

UNITED STATES PATENT OFFICE 2,133,021

PACKAGE

George K. S. Ferguson, Baltimore, Md., assignor to The Baltimore Paper Box Company, Baltimore, Md., a corporation Application October 15, 1935, Serial No. 45,135

6 Claims. (Cl. 206—46)

This invention relates to improvements in packages, and more especially to improvements in vented packages of the type disclosed in my Patent No. 1,946,315. In said patent, I have disclosed a vent flue to allow for the circulation of air to prevent spoilage of fruits or the like contained within the package.

The primary object of the present invention is to provide a vented package particularly adapted for fresh vegetables or fruits to facilitate the escape of heat and to allow for freezing of the vegetables or fruits for storage or shipping purposes. The improved package makes it possible for a grocer having a relatively small business to handle frozen fruits and vegetables without the necessity of investment in expensive refrigeration equipment usually required to keep such fruits and vegetables in proper condition until sold. It also makes it possible for the distributor to use the regular trucking agencies now in existence, and to distribute frozen fruits and vegetables without the necessity of a refrigerated truck, in small enough quantities that the grocer can secure a fresh supply from the distributor's refrigerated warehouse daily, and to sell the same before spoilage.

Another object of the invention is to provide a method of packaging, freezing and handling through cold storage, of frozen fruits and vegetables to the distributor, so that such commodities may be packed at the point of picking, frozen for preservation purposes, and reach the ultimate consumer in substantially fresh condition. For example, in accordance with my method, a producer may pick fruits or vegetables while fresh, subject them for a few minutes to scalding water in order to blanch them, then submerge the same in cold water for cooling purposes, and then pack them in my special packages and haul the packages to a refrigerating plant, say a hundred miles away. As the packages are provided with special venting means, the fruits or vegetables may be frozen while contained in the packages, and if such fruits or vegetables have a tendency to expand due to freezing, the packages will allow for such expansion. After the contents of the packages have been frozen, they may be stored in cold storage, and afterwards, they may be shipped in ordinary trucks to the point of distribution as needed. If it is necessary to maintain the contents of the packages in cold condition for an extended period of time after removal from cold storage, the vents may be closed in a special way, and in certain cases, dry ice or any other suitable refrigerant may be stored in the vent cell of the package before the latter is sealed.

Before proceeding with a detail description of the invention, I may state that the packages are so constructed that when they are piled one on another or side by side, the vent passageways of adjacent packages will cooperate to form ventilation flues to permit rapid escape of heated air.

The invention will be described in connection with the accompanying drawings, in which:

Fig. 1 is a perspective view of one form of my improved package in closed condition.

Fig. 2 is a similar view of the package, showing the closing flaps in open position and exposing the secondary telescopic containers.

Fig. 3 is a vertical sectional view of this form of the package, taken on the line 3—3 of Fig. 1.

Fig. 4 is an end elevation of several of these packages arranged in superposed relation and illustrating the manner in which the top and bottom flaps of the packages form horizontal air passageways communicating with the vertical vent flues of the packages.

Fig. 5 is a perspective view of a modification in which the end flaps are of such construction that they may be folded back on themselves for venting purposes, or may be sealed for sealing the contents of the package. In this form of the invention, special means are arranged within the package for insulation purposes, and for the circulation of air.

Fig. 6 is a view similar to Fig. 5 but showing the end flaps folded back upon themselves.

Fig. 7 is a perspective view of the same form of package with the flaps open, and with a portion of one flap cut away to facilitate illustration.

Fig. 8 is a transverse vertical sectional view taken on the line 8—8 of Fig. 6.

Fig. 9 is an enlarged transverse sectional view of a detail taken on the line 9—9 of Fig. 5.

Fig. 10 is a side elevation of a number of these packages piled one on the other.

Fig. 11 is a perspective view of another modification in which the vent openings are at opposite ends of the package instead of at the top and bottom of the same. In this form of the invention, frusto-conical cups are used as inner containers instead of telescopic boxes.

Fig. 12 is a vertical sectional view of one of these packages, taken on the line 12—12 of Fig. 13.

Fig. 13 is a top plan view of a number of these packages arranged end to end and illustrating the manner in which the end flaps form vertical flues between adjacent packages.

Figs. 14 to 18 inclusive illustrate a further modification in which cylindrical cans contained within the package form a vertical flue. In this example also, the end flaps may be folded back upon themselves to provide top and bottom openings communicating with the flue.

Fig. 14 is a perspective view of this form of the package with the end flaps open.

Fig. 15 is a top plan view with the end flaps bent back upon themselves.

Fig. 16 is a vertical sectional view of a pair of these packages, the section being taken on the line 16—16 of Fig. 15.

Fig. 17 is a perspective view with inner cylindrical containers of telescoping form instead of tin cans.

Fig. 18 is a vertical sectional view taken on the line 18—18 of Fig. 17.

In the embodiment of the invention illustrated in Figs. 1 to 4 inclusive, 19 designates a primary container or carton, preferably formed of double faced corrugated fibre board and consisting of side walls 20, end walls 21, upper and lower side flaps 22 and 23, and upper and lower end flaps 24.

A vertical vent flue 25 is arranged in the central portion of the carton, and as it is of substantially the same height as the side walls, it acts as a support for the top flaps, as well as for other packages when they are piled on the carton. Notches or openings 26 in the upper portion of the walls of the vent flue lace the flue in communication with the upper portion of the interior of the primary carton.

Secondary containers 27, (six in this instance), are arranged in the primary carton and surround the vent flue, and each of the secondary containers is preferably of rectangular form and of telescopic construction, the part marked 28 being the bottom or tray portion of the secondary container, and the part marked 29 being the skirted cover portion. As the secondary containers are of less height than the interior of the primary carton, air can circulate from the space within the primary carton and above the secondary containers to and from the vent flue 25.

The space 30 above the secondary containers also permits the covers 29 to rise when fruits or vegetables contained within the secondary containers expand due to freezing or for other causes, and when the expansion is of such a degree as to bring the tops 29 of the secondary containers into contact with the top flaps of the primary container, the contents of the secondary containers will act as supports for packages piled on the primary carton.

After the secondary containers with their contents have been placed in the primary carton, the end flaps 24 are first folded over into the positions shown in Fig. 1, and then the upper side flaps 22 are folded over on top of the flaps 24, as in Fig. 1. Then, any suitable fastening means, such as pieces of gummed tape 31 may be used to secure the flaps 22 to the end walls 21.

As shown in Fig. 4, when a number of such packages are piled one on the other, their vertical flues 25 will communicate by reason of the openings 32 and 33 in the bottoms and tops of the primary containers, and as the flaps 22 are relatively thick, horizontal air passageways 34 will be provided between adjacent cartons to dissipate air from the flues.

The openings in the top and bottom of the primary carton may be made in various ways, but I prefer to provide these openings by making the flaps too short to meet one another.

In one method of using such packages, a producer of vegetables or fruits will pick the same and then blanch them by treatment with scalding water for a period of a few minutes. Then he will submerge the vegetables or fruits in cold water to dissipate the heat, and afterwards pack the vegetables or fruits in the secondary containers 29. These containers will be placed in the primary carton in the manner shown, and then the upper flaps 24 and 22 are folded and secured in place as shown in Fig. 1. Now, a number of these packages may be placed side by side or one on the other within a truck and hauled to a refrigerating plant. In the latter, they may be piled one on another, and the communicating vertical flues 25, and horizontal ducts 34 will allow rapid dissipation of heat. As the contents of the secondary containers freeze and expand, the covers 29 of these containers will rise and contact with the cover flaps of the primary container, and afterwards will act as supports for upper packages.

As such packages are relatively small, they may be removed one or more at a time from a cold storage plant, and be shipped to the distributor. Consumers acquiring vegetables or fruits from the distributor, will thus be assured of these commodities in substantially fresh condition.

In the modification illustrated in Figs. 5 to 10 inclusive, I have provided for retaining the fruits and vegetables in chilled condition for long periods after leaving cold storage. This is accomplished by sealing the package, insulating the secondary containers against the entrance of heat, utilizing dry ice or some other suitable refrigerant, or by a combination of such means. In this form of the invention, the primary carton may be like that shown in Figs. 1 to 4 inclusive, with the exception that the end flaps 24a overlie the side flaps 22a, and each end flap is extended to form a wing 24b. These wings may be bent back on to the flaps 24a along the score lines 24c, as shown in Figs. 6 and 10.

In this embodiment, the vent flue 25a may extend the full length of the primary carton, and may be intersected by a transverse vertical partition 25b. The upper end portions of the wall of the flue and said partition have notches or openings 26a to allow for the circulation of air at the upper portion of the interior of the primary container, and through the vertical flue.

For insulation purposes, the vertical walls of the primary carton are lined by a vertical strip 35 of double-faced corrugated fibre board, and this strip is preferably of the same height as the primary container to prevent the entrance of heat to the secondary containers 27a arranged within the primary container. In this instance, the secondary containers are also of telescopic form, and they are of less height than the primary container.

When blanched fruits or vegetables are placed in the secondary containers, and the latter are arranged in the primary cartons shown in Figs. 5 to 10 inclusive, the wings 24b of the top and bottom flaps will be folded back on these flaps, as shown in Fig. 6, and they may be retained in such positions while the goods are shipped to the refrigerating plant, and while they are subjected to freezing. However, when a carton is to be distributed, the wings may be extended to completely close the primary carton, and then sealing tape may be placed over all cracks to seal the contents. Of course, after the bottom portion of the primary container has been sealed, a piece 36 (Fig. 9) of dry ice or any other suitable refrigerant, may be placed in the vent flue 25a, and after the top of the primary carton is sealed, the refrigerant will function to maintain the contents of the secondary containers in frozen condition for lengthy periods of time.

Where dry ice or the like is to be used, I prefer to employ auxiliary liners to partially surround the secondary containers, and to facilitate the circulation of cold air. For this purpose, I use pieces of single faced corrugated fibre board 37. Each piece is of the same length as the interior of the primary carton, as shown in Fig. 7, and each piece consists, as shown in Fig. 9, of a bottom portion 37a, a side portion 37b, and a top portion 37c. In other words, the piece extends from the lower portion of the vent flue 25a along the lower portion of the primary carton, beneath a pair of the secondary containers, then upwardly parallel to a side wall of the primary container, and then along the top portion of the primary container to a position at the upper end of the vent flue. As the facing of each piece 37 will confront the secondary containers, the grooves 38 of these pieces of corrugated board will form channels extending from the lower portion of the vent flue, substantially around certain secondary containers, and then back to the top portion of the vent flue. Due to this construction, heat units tending to enter these channels will be circulated, and the heat will be dissipated, owing to the presence of the refrigerant 36.

Fig. 10 illustrates the manner in which a number of the containers shown in Fig. 6 may be piled one on the other to provide horizontal air ducts 39 which will communicate with the vertical flues when the primary cartons are in unsealed condition.

Instead of having the special wing flaps at the top and bottom of the primary container, they may be placed at the ends, as shown in Fig. 11. In this form of the invention, the top 40, bottom 41, and side walls of the primary carton are imperforate, and short flaps 43 extend downwardly from the ends of the top, and short flaps 44 extend upwardly from the ends of the bottom. The wing flaps 45 in this case will extend at the ends of the side walls 42, and after the secondary containers 27b with their contents, have been placed in the primary carton, the flaps may be folded as shown at the right hand end of Fig. 11, and the flaps may be held in these positions by gummed tapes 46.

I may use this type of primary container with secondary containers of substantially frusto-conical shape, as shown in Fig. 12. This type of secondary container is well known, and each container has a disk lid 27c. This type of container will provide its own horizontal ventilating ducts 47 within the primary carton, and for reinforcing purposes, I preferably provide the interior of the carton with vertical partitions 48 which are of the same height as the interior of the carton, and allow for circulation of air between the cartons. When packages of this type are piled side by side, with the wing flaps of adjacent cartons engaging one another, as shown in Fig. 13, vertical flues 49 will be formed between the cartons to allow for circulation of air from the flues 47 into the ducts 49.

If the cylindrical secondary containers are employed instead of the rectangular secondary containers of Figs. 1 to 3 inclusive, it is unnecessary to provide any vent stack within the package, as the secondary containers themselves will form a vertical flue. For example, the primary carton 50 shown in Figs. 14 to 16 inclusive, may be of the same general character as that shown in Figs. 5 to 10 inclusive, that is, it will have wing flaps 51 at the top and bottom to provide for openings in the top and bottom of the container, and to form horizontal ducts 52 when the packages are placed one on another. In this example, as the secondary containers 53 are of cylindrical shape, they will form a vertical flue 54 within the package, and such flue will communicate at its ends with the openings 55 and 56 in the bottom and top of the primary container. The type of package shown in Figs. 14 to 16 inclusive is especially suitable where it is desired to rapidly dissipate heat from the contents of tin cans, as the vertical flues within the primary cartons and the horizontal ducts between the cartons facilitate the circulation of air.

In Figs. 17 and 18, I have shown a primary carton like that illustrated in Figs. 1 to 3 inclusive, combined with cylindrical secondary containers having skirted caps. In this embodiment, the end walls 60 of the primary container have top and bottom flaps 62 and 63 of insufficient length to meet when the flaps are folded, and these flaps cooperate with flaps 64 and 65 extending inwardly from the upper and lower ends of the side walls to provide central openings in the top and bottom of the primary container. As the secondary containers 67 are of cylindrical form, they provide a vertical flue 68 through the package. The skirted caps 69 of the secondary containers are normally spaced from the top of the primary carton, but when a commodity within the secondary containers expands, due to freezing, the caps can move upwardly, accommodated by the space 70.

It should be remembered that I have, in the packages shown in Figs. 5 to 16 inclusive, a method which makes it possible for the packer at the production end to pack blanched and cold-water-cooled vegetables or fruits in a package in which they will properly freeze in a refrigerating plant which is anywhere from one to one hundred miles from the point of packing, and this same package, after being resealed, will serve as an insulated freezer in transport through to the retailer of the contents of the package. Of course, the double insulating features in Figs. 5 to 10 inclusive are not essential on restaurant or hotel packages in the larger cities where they have, at the present time, refrigerated trucks or very rapid deliver service, but the double insulating feature, as outlined above, does bring the more outlying towns and cities within the reach of the distributor of frozen fruits or vegetables in an economic package that will answer all requirements from the producer through to the consumer.

Due to my invention, it is possible for a producer having no refrigerating facilities to blanch vegetables or fruits, remove the heat of the blanching process by submerging the vegetables or fruits in cold running water, pack them by weight or by dry measure in the secondary containers, place the latter in the primary container, then transport the package to cold storage. At the refrigerating plant, these packages may be piled in close relation to each other, side by side, and one on top of the other, and even though the contents of the secondary containers expand, this will not affect the package. Of course, such packages may be distributed as hereinbefore mentioned.

While I have disclosed what I now consider to be some preferred embodiments of the invention in such manner that they may be readily understood, I am aware that changes may be made in the details disclosed, without departing from the spirit of the invention as expressed in the claims.

What is claimed and desired to be secured by Letters Patent is:

1. A vented package comprising a primary carton formed of fiber board and consisting of side walls, end walls and a top and bottom, the top and bottom being formed of folded flaps having their edges spaced to provide openings in the top and bottom of the carton, an annular wall arranged within the primary container and extending from the top to the bottom of the latter, said wall forming a vertical ventilating flue communicating with said openings, said wall having openings placing the interior of the flue in communication with the portion of the interior of the primary carton which surrounds the flue, and secondary cartons of less height than the interior of the primary carton and of telescopic construction arranged within the primary carton exteriorly of said wall, some of said flaps being provided with wings which when in extended position close the openings in the top and bottom of the primary carton.

2. A package comprising a primary carton formed of fiber board and consisting of a top portion, a bottom portion, side wall portions and end wall portions, certain oppositely disposed portions of the carton being provided with aligned ventilating openings, a vent flue in the carton communicating with said openings, and secondary telescopic containers arranged within the carton and only partially filling the space within the carton, and means placing the unoccupied space within the carton in communication with said flue.

3. A package for fresh vegetables and fruits comprising a primary carton formed of fiber board and consisting of a top portion, a bottom portion, side wall portions and end wall portions, the top and bottom portions being formed of flaps forming aligned ventilating openings in the top and bottom portions of the carton, a vertical vent flue in the primary carton of substantially the same height as the interior of the carton and communicating with said openings, telescopic secondary containers arranged in the carton and snugly fitting between the flue and wall portions of the carton, the secondary containers being of less height than the interior of the primary carton so as to leave a chamber between the tops of the secondary containers and the top portion of the carton, and openings in the wall of the flue placing said chamber in communication with the flue.

4. In a package of the character described a primary carton having a flue in its central portion, secondary containers arranged within the carton at opposite sides of the flue, and passageways extending from the lower portion of the flue, underneath said secondary containers, up the outer sides of the latter, over the tops of the secondary containers and back to the upper portion of the flue.

5. In a package of the character described a primary carton having a flue in its central portion, secondary containers arranged within the carton at opposite sides of the flue, passageways extending from the lower portion of the flue, underneath said secondary containers, up the outer sides of the latter, over the tops of the secondary containers and back to the upper portion of the flue, and a liner of insulated material arranged between said passageways and the wall of the carton.

6. In a package of the character described a primary carton having a flue in its central portion, secondary containers arranged within the carton at opposite sides of the flue, passageways extending from the lower portion of the flue, underneath said secondary containers, up the outer sides of the latter, over the tops of the secondary containers and back to the upper portion of the flue, and an insulating lining arranged between a wall of the carton and some of said secondary containers.

GEORGE K. S. FERGUSON.